United States Patent
Yi et al.

(10) Patent No.: US 11,594,073 B2
(45) Date of Patent: Feb. 28, 2023

(54) FACE RECOGNITION METHOD AND FACE RECOGNITION DEVICE

(71) Applicant: UNIVERSITY OF SEOUL INDUSTRY COOPERATION FOUNDATION, Seoul (KR)

(72) Inventors: Young Min Yi, Seoul (KR); Kyung Chul Park, Seoul (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 138 days.

(21) Appl. No.: 17/280,928

(22) PCT Filed: Oct. 10, 2019

(86) PCT No.: PCT/KR2019/013257
§ 371 (c)(1),
(2) Date: Mar. 29, 2021

(87) PCT Pub. No.: WO2020/080734
PCT Pub. Date: Apr. 23, 2020

(65) Prior Publication Data
US 2021/0342577 A1 Nov. 4, 2021

(30) Foreign Application Priority Data
Oct. 16, 2018 (KR) .................. 10-2018-0123067

(51) Int. Cl.
*G06V 40/16* (2022.01)
*G06V 40/50* (2022.01)

(52) U.S. Cl.
CPC .......... *G06V 40/172* (2022.01); *G06V 40/161* (2022.01); *G06V 40/168* (2022.01); *G06V 40/50* (2022.01)

(58) Field of Classification Search
CPC .. G06V 40/172; G06V 40/161; G06V 40/168; G06V 40/50; G06V 10/82; G06V 20/52; G06V 40/165; G06V 40/173; G06V 40/16; G06V 10/469; G06N 3/08; G06N 5/022; G06N 5/04; G06N 5/048; G06K 9/00892; G06K 9/00369; G06K 9/00275;
(Continued)

(56) References Cited

U.S. PATENT DOCUMENTS

2006/0008152 A1* 1/2006 Kumar ............... G11B 27/11
386/E5.064
2006/0050933 A1 3/2006 Hartwig et al.
(Continued)

FOREIGN PATENT DOCUMENTS

JP 2014-021846 A 2/2014
KR 10-2007-0070151 A 7/2007
(Continued)

*Primary Examiner* — Nimesh Patel
(74) *Attorney, Agent, or Firm* — Revolution IP, PLLC

(57) ABSTRACT

The present invention relates to a face recognition method and a face recognition device, the method including: a step for detecting one or more faces in an image frame; a step for updating a face object in a face list by using the one or more pieces of detected face information; and a step for recognizing an identity corresponding to the face object by using a plurality of feature vectors of the face object in the updated face list.

13 Claims, 6 Drawing Sheets

(58) Field of Classification Search
CPC ..... G06K 2009/00946; G06K 9/00993; G06K 9/00979; G06K 9/00771; G06K 9/00288; G06K 2209/15; G06K 2009/00738; G06K 9/00228; G06K 9/00248; G06K 9/00778; G06K 2209/27; G06K 9/00087; G06K 9/00201; G06K 9/00221; G06K 9/00281; G06K 9/00302; G06K 9/00362; G06K 9/46; G06K 9/6219; G06K 9/6267; G06K 7/10366; G06K 9/3208; G06K 19/06037; G06K 19/0723; G06K 19/08; G06F 21/32; G06F 16/29; G06F 21/31; G06F 21/50; G06F 3/0481; G06F 16/587; G06F 16/9577; G06F 1/3206; G06F 1/3209; G06F 1/3231; G06F 21/00; G06F 2221/2149; G06Q 20/3226; G06Q 20/3674; G06Q 20/32; G06Q 20/325; G06Q 20/3276; G06Q 20/40145; G06Q 20/425; G06Q 50/265; G06Q 20/40; H04L 63/0861; H04L 63/102; H04L 67/22; H04L 63/08; H04L 63/12; H04L 63/10; G06T 2207/10016; G06T 7/292; G06T 19/006; G06T 7/70; G06T 11/60; G06T 2207/20224; G06T 7/20; H04M 3/42; H04M 3/42365; G08B 13/19613; G08B 13/19645; G08B 13/19652; G08B 13/19663; G08B 13/19671; G08B 31/00; G08B 27/006

See application file for complete search history.

(56) References Cited

U.S. PATENT DOCUMENTS

| | | | |
|---|---|---|---|
| 2007/0183633 A1* | 8/2007 | Hoffmann | G06V 40/16 382/116 |
| 2008/0175509 A1* | 7/2008 | Wheeler | G06V 10/7557 382/260 |
| 2008/0180542 A1* | 7/2008 | Kuniyuki | G06V 40/161 348/222.1 |
| 2008/0267458 A1* | 10/2008 | Laganiere | G06V 40/16 382/118 |
| 2018/0096223 A1* | 4/2018 | Abou Mahmoud | G06K 9/62 |
| 2020/0089850 A1* | 3/2020 | Wan | G06V 40/165 |

FOREIGN PATENT DOCUMENTS

| | | | | |
|---|---|---|---|---|
| KR | 10-1270351 B1 | 5/2013 | | |
| KR | 10-1297736 B1 | 8/2013 | | |
| KR | 10-1835333 B1 | 3/2018 | | |
| WO | WO-2015078183 A1 * | 6/2015 | ......... | G06K 9/00268 |

* cited by examiner

FACE RECOGNITION METHOD AND FACE RECOGNITION DEVICE

CROSS REFERENCE TO PRIOR APPLICATIONS

This application is the 35 U.S.C. 371 national stage of International application PCT/KR2019/013257 filed on Oct. 10, 2019; which claims priority to Korean Patent Application No. 10-2018-0123067 filed on Oct. 16, 2018. The entire contents of each of the above-identified applications are hereby incorporated by reference.

TECHNICAL FIELD

The present invention relates to a face recognition method and a face recognition device, and more particularly, to a face recognition method and face recognition device capable of real-time face recognition with high accuracy through the application of various face detection schemes and statistical processing for a detected face.

BACKGROUND ART

With the development of a deep learning technology, it has become possible to detect and recognize an object with high accuracy within an image through the deep learning technology. Accordingly, research for detecting or recognizing text within an image or detect a face of a specific target within an image from CCTV is actively carried out.

Face recognition is one field of computer vision for extracting features from a face of a subject for photography within an image and determining whose face is a corresponding face, and is most actively researched in fields such as security.

A system for recognizing a face within an image is composed of face detection (finding) and face recognition processes. Face detection is the step of detecting a face of a person within an image. Face recognition includes determining that a detected face corresponds to whose face.

Deep learning technology-based face detection and recognition enable a face to be found and recognized within an image with high accuracy. However, there is a problem in that an execution time is great due to a high computational load necessary for an implementation of the deep learning technology. Accordingly, there exist limitations in processing an image having high resolution in real time.

In particular, as imaging equipment such as CCTV having high resolution is recently widely distributed, there is a need to develop a face recognition system for processing an high resolution image in real time having high accuracy like the deep learning technology.

DISCLOSURE

Technical Problem

The present invention has been made to solve the above problems and an object of the present invention is to provide a face recognition method and face recognition device capable of real-time face recognition from an image at a high face recognition rate.

Furthermore, an object of the present invention is to provide a face recognition method and face recognition device capable of detecting a face in an image in real time without reducing a face detection rate compared to deep learning-based face detection by mixing and applying another face detection scheme and a face tracker along with the deep learning-based face detection.

Furthermore, an object of the present invention is to provide a face recognition method and face recognition device having a high face recognition rate without reducing the recognition rate according to image quality, an angle, a lighting change, etc. which occur according to a movement of a subject for photography within an image upon face recognition through statistical processing for information of a face object extracted from a series of image frames.

Technical objects to be achieved in the present disclosure are not limited to the aforementioned technical objects, and other technical objects not described above may be evidently understood by a person having ordinary skill in the art to which the present disclosure pertains from the following description.

Technical Solution

A face recognition method according to an aspect of the present disclosure includes the steps of detecting one or more faces in an image frame, updating a face object of a face list by using information of the detected one or more faces, and recognizing an identity corresponding to the face object by using a plurality of feature vectors of the updated face object of the face list.

In the face recognition method, the step of detecting the faces includes detecting a face in the image frame according to a deep learning face detection algorithm if the image frame is an image frame according to a designated period, and detecting a face in the image frame according to a Histogram of Oriented Gradients (HOG)-based face detection algorithm if the image frame is not an image frame according to the designated period. A face detection number according to the HOG-based face detection algorithm is greater than a face detection number according to the deep learning face detection algorithm.

In the face recognition method, the step of updating the face object of the face list includes calculating an Intersection over Union (IOU) value between the face object and detected faces, and changing a face location of the face object into a location of a detected face when the calculated IOU value is a threshold or more.

In the face recognition method, the step of updating the face object of the face list includes tracking the face object by using a face tracker when each of calculated IOU values between all the detected faces is less than the threshold, and removing the face object from the face list when a face detection failure number is a designated number or more.

In the face recognition method, the step of updating the face object of the face list includes generating, in the face list, a new face object indicative of the detected face if the detected face is not mapped on all face objects of the face list based on the calculation of the IOU value and a comparison of the threshold.

In the face recognition method, the step of updating the face object of the face list includes extracting a feature vector from detected face data corresponding to the face object, and mapping the feature vector of the detected face on one of a plurality of face objects based on similarity between a feature vector from data of a single detected face and each of plurality of feature vectors corresponding to the plurality of face objects if the single detected face corresponding to the plurality of face objects is present.

In the face recognition method, the step of recognizing the identity corresponding to the face object by using the plurality of feature vectors includes determining, as the identity of the face object, an identity of a feature vector corresponding to identity prediction having a highest reliability in the identity prediction performed using each of the plurality of feature vectors corresponding to the face object from a series of image frames.

In the face recognition method, the step of recognizing the identity corresponding to the face object by using the plurality of feature vectors includes calculating a mean feature vector from the plurality of feature vectors corresponding to the face object from a series of image frames, and recognizing the identity corresponding to the face object by using the calculated mean feature vector.

A face recognition device according to an aspect of the present disclosure includes an image reception unit receiving one or more image frames, a storage unit storing the received image frame and a face list indicatives of recognized one or more face objects, and a control unit detecting one or more faces in the received image frame, updating a face object of the face list of the storage unit by using information of the detected one or more faces, and recognizing an identity corresponding to the face object by using a plurality of feature vectors of the updated face object of the face list.

In the face recognition device, in order to detect the one or more faces, the control unit detects a face in the image frame according to a deep learning face detection algorithm, if the image frame is an image frame according to a designated period, and detects a face in the image frame according to a Histogram of Oriented Gradients (HOG)-based face detection algorithm accelerated by a Graphics Processing Unit (GUI) of the control unit, if the image frame is not an image frame according to the designated period. A face detection number according to the HOG-based face detection algorithm is greater than a face detection number according to the deep learning face detection algorithm.

In the face recognition device, in order to update the face object of the face list, the control unit calculates an Intersection over Union (IOU) value between the face object and detected faces, and changes a face location of the face object into a location of a detected face when the calculated IOU value is a threshold or more.

In the face recognition device, in order to update the face object of the face list, the control unit tracks the face object by using a face tracker when each of calculated IOU values between all the detected faces is less than the threshold, and removes the face object from the face list when a face detection failure number is a designated number or more.

In the face recognition device, in order to update the face object of the face list, the control unit generates, in the face list, a new face object indicative of the detected face if the detected face is not mapped on all face objects of the face list based on the calculation of the IOU value and a comparison of the threshold.

In the face recognition device, in order to update the face object of the face list, the control unit extracts a feature vector from detected face data corresponding to the face object, and maps the feature vector of the detected face on one of a plurality of face objects based on similarity between a feature vector from data of a single detected face and each of plurality of feature vectors corresponding to the plurality of face objects if the single detected face corresponding to the plurality of face objects is present.

In the face recognition device, in order to recognize the identity corresponding to the face object by using the plurality of feature vectors, the control unit determines, as the identity of the face object, an identity of a feature vector corresponding to identity prediction having a highest reliability in the identity prediction performed using each of the plurality of feature vectors corresponding to the face object from a series of image frames.

Advantageous Effects

The face recognition method and the face recognition device according to the present disclosure have an effect in that real-time face recognition is possible from an image at a high face recognition rate.

Furthermore, the face recognition method and the face recognition device according to the present disclosure have an effect in that a face can be detected in an image in real time without reducing a face detection rate compared to deep learning-based face detection by mixing and applying another face detection scheme and a face tracker along with the deep learning-based face detection.

Furthermore, the face recognition method and the face recognition device according to the present disclosure have an effect in that they have a high face recognition rate without reducing the recognition rate according to image quality, an angle, a lighting change, etc. which occur according to a movement of a subject for photography within an image upon face recognition through statistical processing for information of a face object extracted from a series of image frames.

Effects which may be obtained in the present disclosure are not limited to the aforementioned effects, and other technical effects not described above may be evidently understood by a person having ordinary skill in the art to which the present disclosure pertains from the following description.

Figure 1:
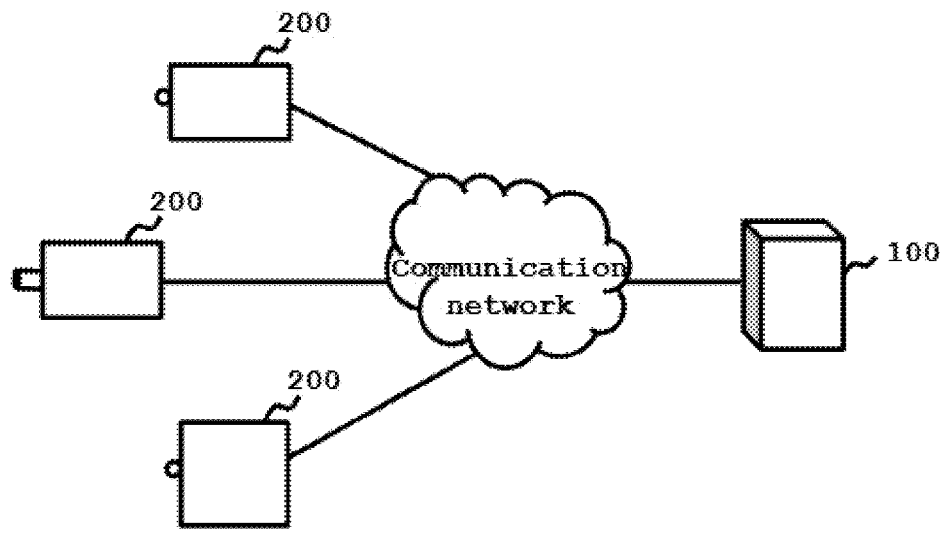
FIG. 1 is a diagram illustrating an example of a connection configuration between devices configured in a face recognition system.

DESCRIPTION OF REFERENCE NUMERALS 100 face recognition device
110: image reception unit
130: storage unit
131: face list
150: connection unit
170: control unit
171: main processor
173: GPU
200: imaging device

MODE FOR INVENTION

The aforementioned objects, characteristics, and merits will become more evident through a detailed description specifically described with reference to the accompanying drawings, and thus a person having ordinary skill in the art to which the present disclosure pertains may readily practice the technical spirit of the present disclosure. Furthermore, in describing the present disclosure, a detailed description of a known art related to the present disclosure will be omitted if it is deemed to make the gist of the present disclosure unnecessarily vague. Hereinafter, preferred embodiments according to the present disclosure are described in detail with reference to the accompanying drawings.

FIG. 1 is a diagram illustrating an example of a connection configuration between devices configured in a face recognition system.

As in the example of FIG. 1, the face recognition system includes a face recognition device 100 and one or more imaging devices 200. The face recognition device 100 and the imaging device 200 are connected over a communication network.

The face recognition system according to the present disclosure is configured to be capable of detecting a face from an image frame and to recognizing the identity of the detected face. The face recognition system is used in various fields. For example, the face recognition system may be used for a system for access control or may be applied to a security system, etc.

Components of the face recognition system are described in brief. The imaging device 200 is equipped with a camera, and captures an image exposed through a camera lens. The imaging device 200 may transmit a series of captured image frames to the face recognition device 100 as a packet having a known format, such as compression or non-compression, over a communication network.

The imaging device 200 may be CCTV, a camera, a network camera, etc. which may be used in a security field or an access control field. Alternatively, the imaging device 200 may be a mobile phone, a smartphone, a tablet PC, a notebook, a personal computer, etc. The imaging device 200 is equipped with at least a camera (sensor), and may transmit, to the face recognition device 100, a series of image frames captured by the camera according to a compression or non-compression data format.

The face recognition device 100 is connected to the one or more imaging devices 200, and detects a face in an image frame from the imaging device 200 and also recognizes the identity of the detected face. The face recognition device 100 may perform measures or a function according to various applications based on the recognized identity.

The face recognition device 100 is connected to the multiple imaging devices 200 and configured to be capable of recognizing and tracking a face in a series of image frames from the imaging device 200. The face recognition device 100 may operate as a server connected to the Internet (communication network), etc. For example, the face recognition device 100 may be a security (control) server connected to the multiple imaging devices 200 and capable of detecting a face and recognizing an identity in a series of image frames from each of the multiple imaging devices 200 and performing various functions or measures based on the recognized identity.

In another modification, the face recognition device 100 may be a personal device which may be carried by a person or mounted. For example, the face recognition device 100 may be a mobile phone, a smartphone, a tablet PC, a personal computer, a notebook, etc. In this case, the imaging device 200 may be embedded in a personal device, and may transmit a series of captured image frames over a communication network within the personal device. The imaging device 200 embedded in the personal device may be embedded in the personal device, including at least a camera sensor, a camera lens, etc.

The communication network transmits, to the face recognition device 100, an image captured by the one or more imaging devices 200. The communication network may have various configuration examples depending on an implementation example of the face recognition device 100 and the imaging device 200. For example, the communication network may be the Internet, a wideband network such as a mobile communication network, a short distance network such as the Ethernet or a wireless LAN, or a video signal-dedicated embedded bus for transmitting data to a processor within a personal device.

Figure 2:
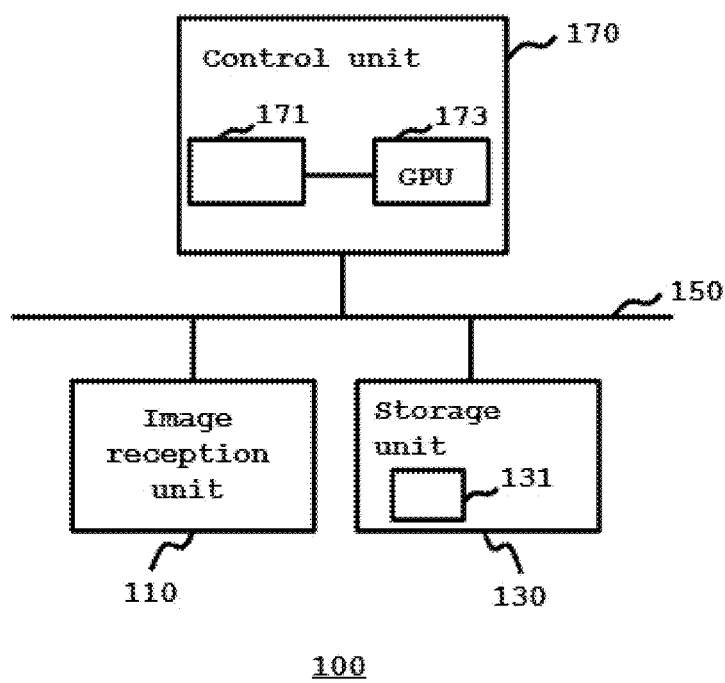
FIG. 2 is a block diagram illustrating an exemplary configuration of a face recognition device.

FIG. 2 is a block diagram illustrating an exemplary configuration of the face recognition device 100.

Referring to FIG. 2, the face recognition device 100 includes an image reception unit 110, a storage unit 130, a connection unit 150 and a control unit 170. The block diagram of FIG. 2 preferably illustrates a functional block diagram. Each function block includes a corresponding hardware block. For example, the face recognition device 100 may be a server composed of a combination of one or more of one or more PCs, workstations and/or server frames. Alternatively, the face recognition device 100 may be a personal device such as a smartphone or a tablet PC.

Each of the components of the face recognition device 100 is described in relation to hardware with reference to FIG. 2. The image reception unit 110 receives an image frame. The image reception unit 110 includes a wireless LAN and/or a wired LAN communication chipset, an antenna, etc., and receives a series of image frames according to a communication packet, etc. from each of the imaging devices 200 over a wideband network or a short distance network. Alternatively, the image reception unit 110 may receive a video signal (data) having a series of image frames from the camera through an embedded bus.

The series of image frames received through the image reception unit 110 may be compressed or not compressed according to a format agreed with the imaging device 200.

The storage unit 130 includes a volatile memory, a non-volatile memory and/or a high-capacity storage medium such as a hard disk and stores various types of data and programs. For example, the storage unit 130 stores various types of programs to be used for face detection and recognition in a non-volatile memory or a hard disk, etc.

The storage unit 130 stores a face detection control program, a deep learning-based face detection program, a Histogram of Oriented Gradients (HOG)-based face detection program, a face tracker program, a face recognition program, etc.

The HOG-based face detection program was proposed by N. Dalal (N. Dalal and B. Triggs, "Histograms of oriented gradients for human detection", Proc. IEEE Comput. Vis. Pattern Recog., 2005, pp. 886-893), and is a kind of feature descriptor used to detect an object. The HOG-based face detection program calculates a local gradient, histograms the local gradient, and uses the local gradient as a feature of an object. The HOG-based object (face) detection algorithm has a faster execution speed than the deep learning-based face detection program, and has a lower face detection rate than the deep learning-based face detection program.

The face tracker program may be a Kernelized Correlation Filters (KCF) tracker (HENRIQUES, Joao F., et al. High-speed tracking with Kernelized correlation filters. IEEE Transactions on Pattern Analysis and Machine Intelligence, 2015, 37.3: 583-596), for example. The face recognition program may be a program which is trained through deep learning or an artificial neural network and uses a Support Vector Machine (SVM) capable of recognizing (classifying) the identity of a face from a face feature vector.

The storage unit 130 further stores a face object update program. The face object update program is a program for managing and updating a face object included in a face list 131 corresponding to each of the imaging devices 200. The face object update program may perform a modification, a change, an addition, removal, etc. on a face object of the face list 131 by using one or more pieces of face information (data) detected in a received image program.

The face object update program may be configured to extract a feature vector of a face from a detected face. The face object update program may have a known face feature extraction program embedded therein and extract a face feature vector. The face object update program may have an OpenFace program or another known feature vector extraction program embedded therein, for example, and may extract a face feature vector, such as 128 dimensions.

In this case, the program stored in the storage unit 130 may be an independent program or may be a program module embedded in a specific program framework. Each of the programs may be associated with another program and may perform various functions.

In addition, the storage unit 130 stores a series of image frames from each of the imaging devices 200, and stores the face list 131 indicative of one or more face objects detected or/and recognized from each of the imaging devices 200. The storage unit 130 may store a plurality of fact lists 131 corresponding to the plurality of imaging devices 200, respectively.

The face list 131 includes one or more face objects. Each of the face objects stores features of a specific face, detected location data, etc. in a series of image frames. A specific face can be efficiently tracked and managed using various feature information extracted or recognized from several image frames through a face object of the face list 131.

The storage unit 130 may further include an identity list. The identity list includes a feature vector and corresponding personal identity information. The feature vector may be extracted from a face, and may be a 128-dimension feature vector, for example. The personal identity information includes or indicates a personal identifier, such as a name, a resident registration number, or a management number.

The connection unit 150 transmits and receives data between blocks within the face recognition device 100. The connection unit includes a short distance network such as a wired LAN or a wireless LAN, a parallel bus, a serial bus, etc. embedded within a device, and transmits and receives various data.

The control unit 170 includes one or more execution units, loads a program stored in the storage unit 130, and controls the face recognition device 100 by executing an instruction code of the program through the execution unit.

The control unit 170 may include multiple execution units capable of performing an instruction code of a program. For example, the control unit 170 may include a main processor 171 and a Graphics Processing Unit (GPU) 173, may load a program of the storage unit 130 onto the main processor 171 and/or the GPU 173, and may detect a face and recognize an identity by controlling the face recognition device 100.

The control unit 170 detects one or more faces in an image frame received from the imaging device 200 by using a program stored in the storage unit 130. In face detection, the deep learning-based face detection program or Histogram of Oriented Gradients (HOG)-based the face detection algorithm (program) of the storage unit 130 may be used. Furthermore, in face detection (e.g., HOG-based face detection), if the existing recognized face is not detected in a current image frame, a specific face may be tracked according to a face tracking algorithm (program).

The control unit 170 updates the face list 131 of the imaging device 200, which is mapped on a received image frame of the storage unit 130, by using information of detected one or more faces. In a process of updating the face list 131, a face object is also updated. The control unit 170 updates a face object of the face list 131 according to a face object update program by using one or more faces (information) detected according to a face detection algorithm.

The control unit 170 recognizes an identity corresponding to a face object by using a plurality of feature vectors extracted from a series of image frames corresponding to a face object of the updated face list 131. The control unit 170 may recognize an identity corresponding to each face object by using a plurality of feature vectors of a face object of the updated face list 131 by performing the face recognition program of the storage unit 130.

A control flow performed in the control unit 170 in relation to face detection, the update of the face list 131, and identity recognition is described in detail below the FIG. 3.

Figure 3:
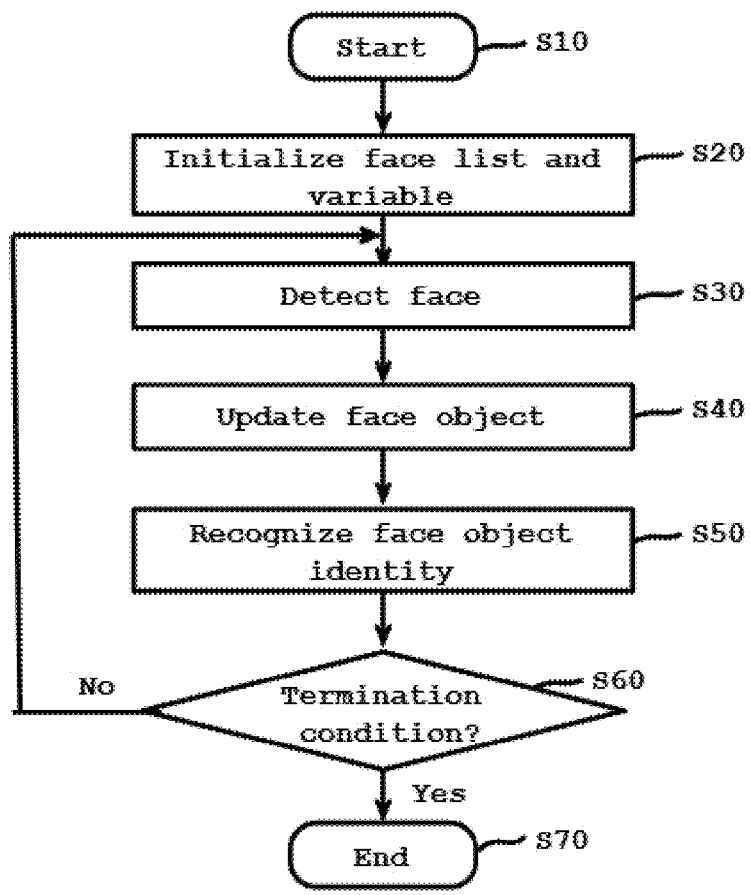
FIG. 3 is a diagram illustrating a major control flow for detecting a face and recognizing an identity from an image frame received from a specific imaging device.

FIG. 3 is a diagram illustrating a major control flow for detecting a face and recognizing an identity from an image frame received from a specific imaging device 200.

The control flow of FIG. 3 is performed in the face recognition device 100, and face detection and identity recognition are performed on each of the imaging devices 200. That is, the control flow of FIG. 3 is performed for each of the imaging devices 200. The control flow of FIG. 3 is preferably performed through control of the control unit 170 which loads and performs various types of programs of the storage unit 130.

First, the control flow is started in response to a request from a user or booting of the face recognition device 100 (S10). (The control unit 170 of) the face recognition device 100 initializes the face list 131 and a variable of the storage unit 130 corresponding to the imaging device 200 (S20).

For example, (the control unit 170 of) the face recognition device 100 configures the face list 131 of the imaging device 200 as a null list, and resets an image frame number to be processed to 0. The face list 131 may include or store one or more face objects. The image frame number may be the frame number of an image frame being processed. The image frame number may be represented as a series of numbers.

Subsequently to the initialization, (the control unit 170 of) the face recognition device 100 detect one or more faces in an image frame received and stored in the storage unit 130, and configures face information indicative of the detected face (S30). In the face detection process, (the control unit 170 of) the face recognition device 100 uses the deep learning-based face detection program or the HOG-based face detection program, and may further use a face tracking program.

Detailed contents related to face detection is further described in detail below with reference to FIG. 4.

Subsequently to the face detection, (the control unit 170 of) the face recognition device 100 updates a face object of the face list 131, corresponding to the imaging device 200, using the detected one or more face information (S40). For example, (the control unit 170 of) the face recognition device 100 may add a face object to the face list 131 or may change or remove the face object based on information of the detected one or more faces by performing the face object update program.

Detailed contents related to the update of the face list 131 are further described in detail below with reference to FIG. 6.

After the update of the face list 131, (the control unit 170 of) the face recognition device 100 recognizes an identity corresponding to each of the updated face objects of the face list 131 (S50). (The control unit 170 of) the face recognition device 100 that performs a face recognition program may recognize an identity corresponding to each face object by comparing feature vectors of the identity list of the storage unit 130 by using a plurality of feature vectors stored in accordance with the face objects, respectively. Each of the plurality of feature vectors stored in accordance with the face objects is a feature vector extracted from face data detected in each of image frames received from a corresponding imaging device 200.

As the identity of the face object is recognized, (the control unit 170 of) the face recognition device 100 records identity information on the face object, and determines whether a termination condition has been reached (S60). The termination condition may be a disconnection of a communication connection with the imaging device 200, the last image frame number or the reception of an end input, for example.

If the termination condition is not reached, (the control unit 170 of) the face recognition device 100 may repeatedly perform the face detection (S30), the face object update (S40) and the identity recognition (S50) on a subsequently received image frame.

If the termination condition is reached, (the control unit 170 of) the face recognition device 100 may terminate the face recognition for the specific imaging device 200 (S70).

Figure 4:
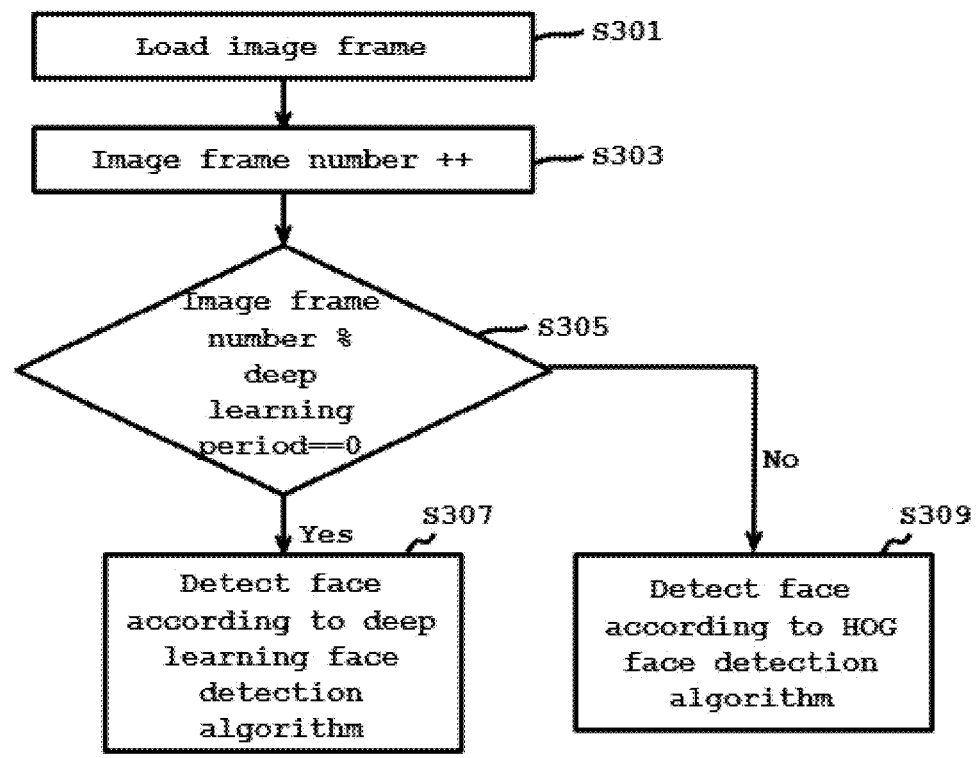
FIG. 4 is a diagram illustrating a detailed control flow for face detection.

FIG. 4 is a diagram illustrating a detailed control flow for face detection.

The control flow of FIG. 4 is performed in the face recognition device 100, and is preferably performed as the control unit 170 performs the deep learning-based face detection program and the HOG-based face detection program according to a face detection control program.

(The control unit 170 of) the face recognition device 100 loads an image frame, received from the imaging device 200, etc. and stored in the storage unit 130, onto a volatile memory, etc. according to the face detection control program (S301). The storage unit 130 may store a series of image frames received from each imaging device 200. (The control unit 170 of) the face recognition device 100 may select an image frame (e.g., a frame having the longest reception timing or the smaller frame number among frames that have not been used) not used for face recognition among a series of (consecutive) image frames, and may load the selected image frame onto a volatile memory, etc.

(The control unit 170 of) the face recognition device 100 updates the frame number of a current image frame by increasing the image frame number by 1 (S303) according to the face detection control program. If a frame number is included in an image frame, an image frame number may be updated with the frame number of the image frame.

(The control unit 170 of) the face recognition device 100 determines whether a current image frame is an image frame corresponding to a deep learning execution period according to the face detection control program (S305).

For example, (the control unit 170 of) the face recognition device 100 may perform a modular operation (%) on a current image frame number according to a deep learning execution period, and may determine whether the current image frame is an image frame according to the deep learning execution period based on whether a result of the modular operation is 0. The deep learning execution period may be set to 10 (image frames), 5 (image frames), etc.

The deep learning execution period is set to at least 3, and is preferably configured so that a face detection number according to the HOG-based face detection algorithm (program) is greater than a face detection number according to the deep learning face detection algorithm (program) in face detection.

If the current image frame is an image frame corresponding to the deep learning period, (the control unit 170 of) the face recognition device 100 detect a face in the current image frame according to the deep learning face detection algorithm by performing the deep learning-based face detection program (S307).

If the current image frame is not an image frame corresponding to the deep learning period, (the control unit 170 of) the face recognition device 100 detect a face in the current image frame according to the HOG-based face detection algorithm by performing the HOG-based face detection program (S309). (The control unit 170 of) the face recognition device 100 preferably accelerates HOG-based face detection by enabling the GPU 173 to perform some of or the entire HOG-based face detection program.

As the deep learning face detection algorithm and the HOG-based face detection algorithm are mixed and used, a face can be detected at a high detection rate (detection rate) in an image frame to which the deep learning face detection algorithm is applied. A face can be detected in an image frame to which the HOG-based face detection algorithm is applied at a low detection rate, but at a fast speed. Face detection in an image frame having a low face detection rate may be performed at a face detection rate, which is identical with or similar to that of the deep learning face detection algorithm, by further using another information or data of a face object, as described with reference to FIGS. 5 and 6.

According to the face detection algorithm, (the control unit 170 of) the face recognition device 100 may detect 0 or more faces in an image frame, and may recognize a face box that specifies the detected faces. One or more face boxes may be represented as a rectangular coordinate region (up, down, left, and right coordinate values) within an image frame.

Figure 5:
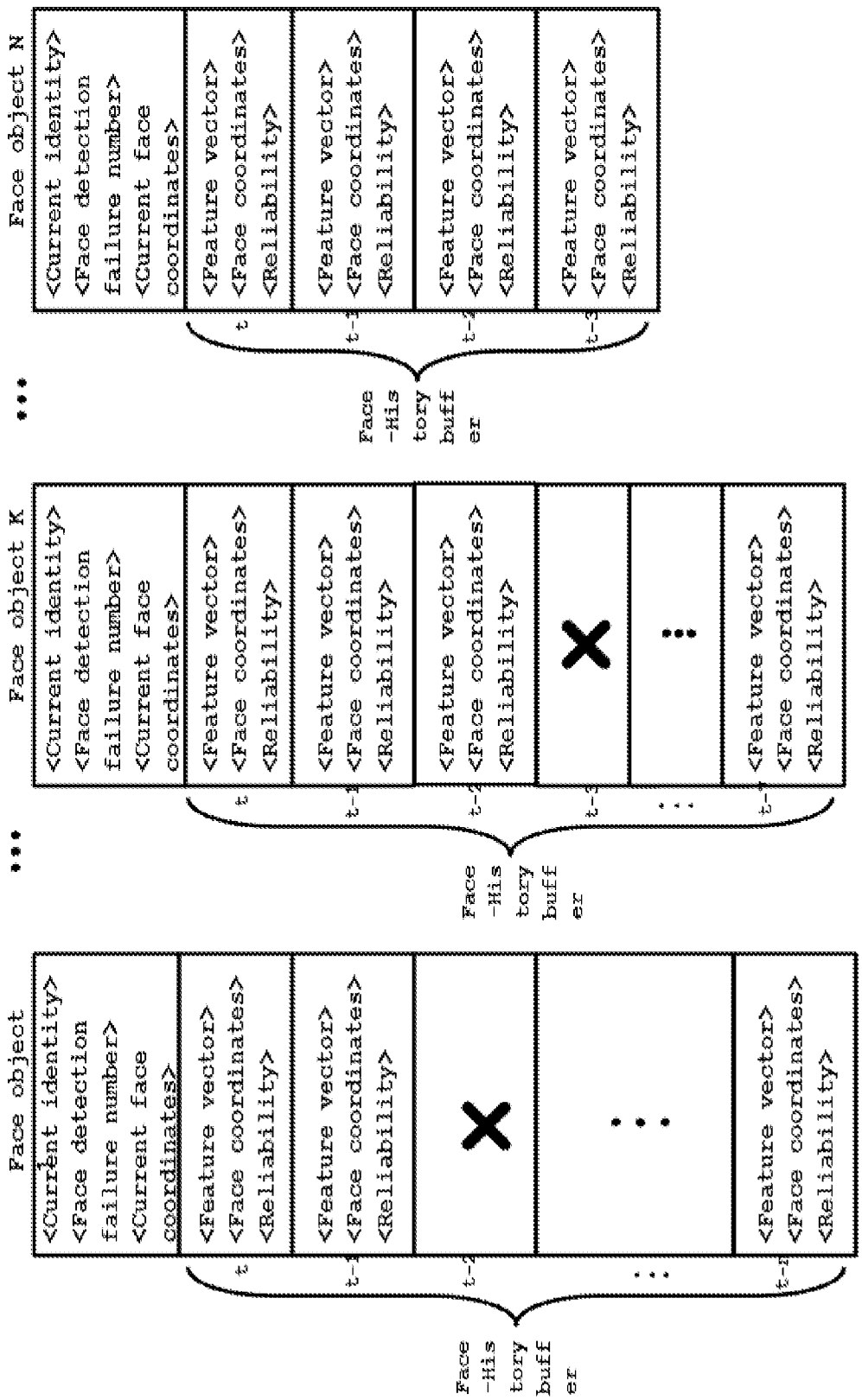
FIG. 5 is a diagram illustrating an exemplary configuration of a face list.

FIG. 5 is a diagram illustrating an exemplary configuration of the face list 131.

The face list 131 of FIG. 5 may be stored in the storage unit 130, and may be modified, changed or added by (the control unit 170 of) the face recognition device 100. (The control unit 170 of) the face recognition device 100 may load the face object update program of the storage unit 130, and may manage the face list 131.

As described with reference to FIG. 5, the face list 131 corresponding to each of the imaging devices 200 stores 0 or more face objects. The number of face objects in the face list 131 may be changed based on the number of face objects recognized in a current frame or an image frame prior to a designated number.

Each of the face objects has current identity information. The current identity information indicates the identity of a face recognized in accordance with a corresponding face object by using a face-history buffer, and may include a personal identifier such as a name, a resident registration number or a management number. As described above, a face object has corresponding current identity information, and an identity corresponding to the face object may be identified.

A face detection failure number included in a face object indicates the number of times that the detection of a corresponding face in an image frame has failed so far after the recognition of the corresponding face. If the face detection failure number increases and reaches a threshold, the face object may be removed from the face list 131.

The face object may further include a face coordinate region of a current face object. A current face coordinate region may be a region of face coordinates of the same object detected in the most recent image frame (e.g., image frame at time t) among image frames. The current face coordinate region may be represented as up, down, left and right coordinate values. For example, the face coordinate region may be represented as top left coordinates and bottom right coordinate.

Each of face objects has a face-history buffer. The face-history buffer is composed of a plurality of entries, and may have a maximum designated number (e.g., 10) of entries. The face-history buffer consists of FIFO, QUEUE, etc. The face-history buffer stores information determined from a face estimated as the same face object in each image frame up to a current frame (time t in FIG. 5) after face recognition (the last entry in each of face-history buffer in FIG. 5).

Each of the entries of the face-history buffer is a null entry (refer to t-2 of a face object 1, t-3 of a face object K, etc. in FIG. 5) depending on whether a face object is detected or includes face information extracted or determined from a corresponding face when the same face is detected.

For example, the entry includes a feature vector, face coordinates, etc. determined from the face box of a face detected in an image frame, and further includes the reliability of an identity, etc. estimated from a feature vector, etc. The feature vector may be a 128-dimension feature vector, for example. The face coordinates may be up, down, left and right coordinates of the face box of a face detected in an image frame. The face coordinates may specify a rectangular face region of a face object, and may be composed of top left coordinates, bottom right coordinate, etc.

As described with reference to FIG. 5, (the control unit 170 of) the face recognition device 100 manages the face list 131 including 0 or more face objects. The face object specifies whether a corresponding face for each image frame is detected, and has a face-history buffer from which various features in a corresponding image frame can be aware when the corresponding face is detected.

Figure 6:
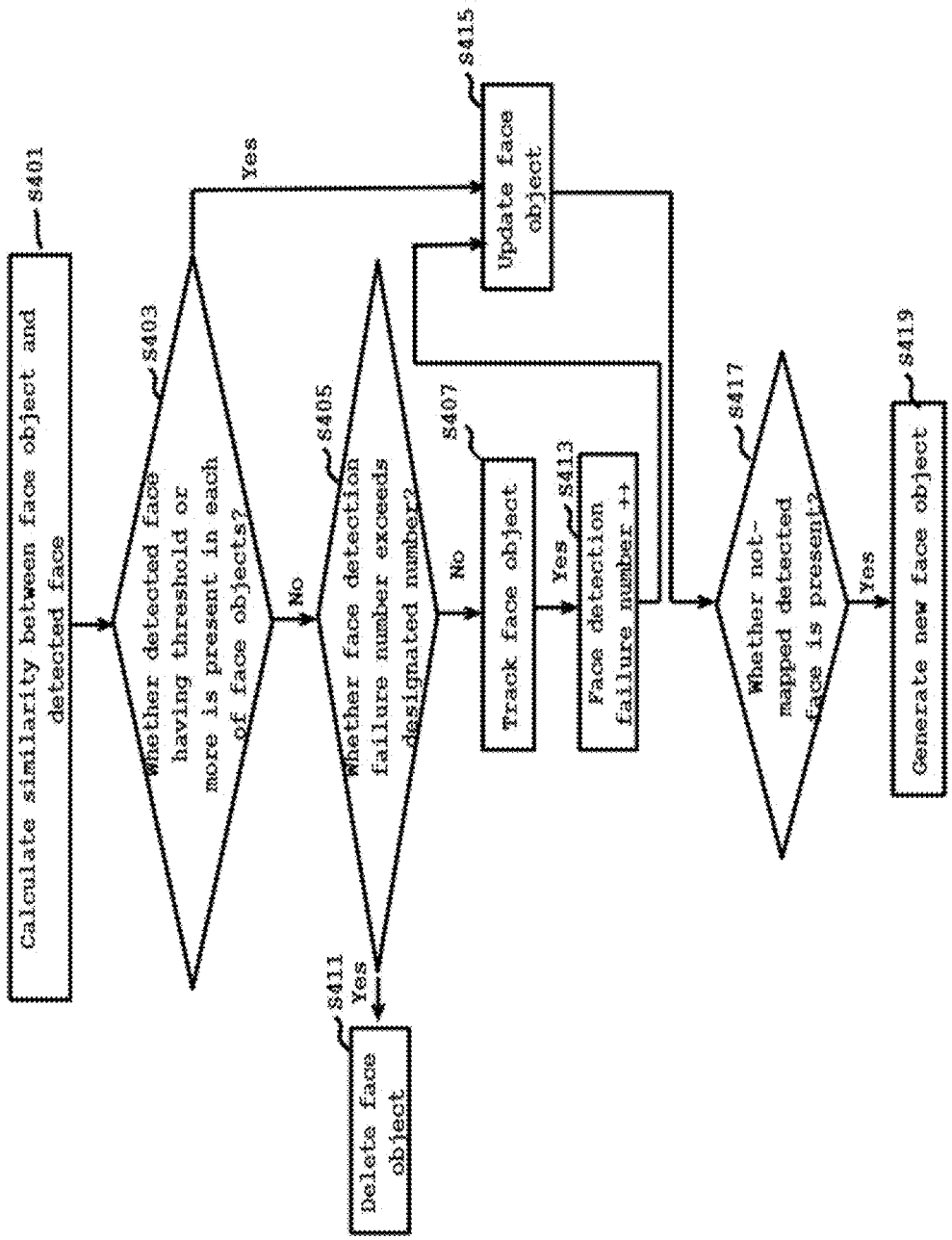
FIG. 6 is a diagram illustrating a detailed control flow for the update of the face list.

FIG. 6 is a diagram illustrating a detailed control flow for the update of the face list 131.

A process of updating the face list 131 in FIG. 6 is performed by (the control unit 170 of) the face recognition device 100. Preferably, the face object update program is loaded, and the face list 131 may be updated.

First, when all faces are detected in a current image frame through the face detection process of FIG. 4, one or more face boxes indicative of the detected faces, respectively, are specified.

(The control unit 170 of) the face recognition device 100 calculates similarity according to a relative location between each of all the face objects of the face list 131 and each of detected faces (S401).

For example, (the control unit 170 of) the face recognition device 100 calculates an Intersection over Union (IOU) value between a current face coordinate region of each of all the face objects and a coordinate region of each of the detected faces (face box). Accordingly, the IOU (similarity) value between each of all the face objects and each of all the detected faces is calculated. The IOU value may be calculated as (the area of an intersection region of the current coordinate region of the face object and the coordinate region of the detected face)/(the area of a union region of the current coordinate region of the face object and the coordinate region of the detected face). As the sizes of a face object and a detected face are similar and the face object and the detected face include many overlap portions, an IOU value is proportionally increased.

After the calculation of the similarity, (the control unit 170 of) the face recognition device 100 determines whether a detected face having a threshold or more is present with respect to each of the face objects of the face list 131 (S403). For example, (the control unit 170 of) the face recognition device 100 may determine whether a detected face having a set threshold (e.g., 0.1) or more is present among IOU values between the face objects and all the detected faces.

If multiple detected faces have an IOU value having a threshold or more with respect to one face object, a detected face having the highest IOU value may be selected, and a corresponding face object may be updated.

When each of IOU values calculated between the face objects of the face list 131 and all the detected faces is less than the threshold, whether a face detection failure number of a corresponding face object exceeds a designated number is determined (S405). The designated number may be a maximum value of an entry which may be included in a face-history buffer of the face object.

If face detection of the corresponding face object fails exceeding the designated number, (the control unit 170 of) the face recognition device 100 deletes the corresponding face object from the face list 131 (S411).

As a case where the face detection failure number is the designated number or less, if a detected face having the threshold or more is not recognized, (the control unit 170 of) the face recognition device 100 tracks a face object in a current image frame (S407).

For example, (the control unit 170 of) the face recognition device 100 tracks a face object in order to detect the same face object within an image frame by using a known face tracker program such as a Kernelized Correlation Filters (KCF) tracker.

Whether the tracking of the face object is successful is determined based on a value of reliability returned by the face tracker. When the value of reliability returned by the face tracker has a set threshold or more, (the control unit 170 of) the face recognition device 100 determines that the face tracking is successful.

When the face tracking is successful, (the control unit 170 of) the face recognition device 100 may receive or recognize a coordinate region, corresponding to the face object, from the face tracker. According to a design modification example, if the face tracking fails, (the control unit 170 of) the face recognition device 100 may delete the face object (S411).

(The control unit 170 of) the face recognition device 100 increases the face detection failure number of a corresponding face object by 1 (S413) and updates the face object (S415).

In the update process S415, (the control unit 170 of) the face recognition device 100 generates a new entry and adds the new entry to the face-history buffer of the face object. (The control unit 170 of) the face recognition device 100 sets the face coordinates (region) of the new entry as the coordinates (region) of a detected face which has the highest similarity (IOU value) or whose tracking is successful.

Furthermore, (the control unit 170 of) the face recognition device 100 sets current face coordinates (region) of the face object as the coordinates (region) of the detected face. As described above, (the control unit 170 of) the face recognition device 100 changes a current face location of the face object into the location of the detected face based on the calculated IOU value. When the face tracking fails, (the control unit 170 of) the face recognition device 100 sets the new entry as a null entry.

In the update process S415, (the control unit 170 of) the face recognition device 100 calculates a feature vector of the new entry and stores the feature vector in the new entry of a face-history buffer.

In the update process S415, (the control unit 170 of) the face recognition device 100 arranges the face box of a detected face having a threshold or more (having the greatest threshold) or the face box of a face detected according to tracking. Face boxes in an image frame have different sizes and thus (the control unit 170 of) the face recognition device 100 arrange an eye, a nose, a mouth, etc. to be located at similar locations.

For example, (the control unit 170 of) the face recognition device 100 performs face landmark detection on a face box, performs a transform through a 2D-Affine transform by using a detected landmark so that an eye, a nose, and a mouth are arranged at similar locations, and resizes the transformed image size of a face box to a designed size (e.g., 96*96).

(The control unit 170 of) the face recognition device 100 extracts a face feature vector by using the aligned face image as an input, and stores the extracted face feature vector as a feature vector of the new entry. (The control unit 170 of) the face recognition device 100 may extract a face feature vector, such as 128 dimensions, using a known feature vector extraction program or algorithm such as OpenFace.

Furthermore, (the control unit 170 of) the face recognition device 100 may determine identity information corresponding to a current extracted face feature vector by using an extracted face feature vector as an input, and may further record corresponding reliability and the identity information on the new entry.

(The control unit 170 of) the face recognition device 100 may provide, as an input factor, the extracted face feature vector to a deep learning-based face recognition program which may be used in a face recognition program, etc. and on which training, etc. has been performed, may determine identity information and a reliability value classified in an identity list stored in the storage unit 130, and may store the identity information and the reliability value in the new entry. The identity information and the reliability value may be omitted depending on a scheme for recognizing an identity from a face object.

In the update process S415, a single detected face may be selected along with (in accordance with) two (or more) face objects based on similarity between coordinate regions, and each face object may be updated.

If two or more face objects are present in a single detected face, a detected face may be selected in a face object having higher similarity (e.g., similarity according to an Euclidean distance between feature vectors) by comparing the feature vector of each of the two or more face objects and a feature vector extracted (calculated) from image data of the face box of the detected face, and a new entry of a corresponding face object may be updated.

The feature vector of each face object may be a feature vector extracted from the most recent image frame of a corresponding face-history buffer and stored. With respect to the remaining face objects having low similarity, in the update process, a new entry may be set as a null entry, and a face detection failure number may be increased by 1.

As described above, if several face objects corresponding to one detected face are present, (the control unit 170 of) the face recognition device 100 maps the detected face and a feature vector thereof on one of the several face objects based on similarity between calculated feature vectors.

After the face object is updated, (the control unit 170 of) the face recognition device 100 determines whether a detected face not mapped on the face object of the face list 131, among all the detected faces, is present (S417).

If a detected face not mapped on the face object is present through the calculation of the IOU value and the threshold comparison, (the control unit 170 of) the face recognition device 100 generates a new face object in the face list 131 (S419).

(The control unit 170 of) the face recognition device 100 adds a face-history buffer to the new face object, and adds and stores a new entry to the face-history buffer. The new entry includes a feature vector calculated from the detected face and face coordinates (region) of the detected face (box), and may further include identity information and/or reliability of a classified identity according to identity recognition.

(The control unit 170 of) the face recognition device 100 may reset a current identity other than the face-history buffer of the new face object, and may reset the face detection failure number. Furthermore, (the control unit 170 of) the face recognition device 100 may generate a new face object by setting current face coordinates (region) as the face coordinates (region) of the new entry.

Figure 7:
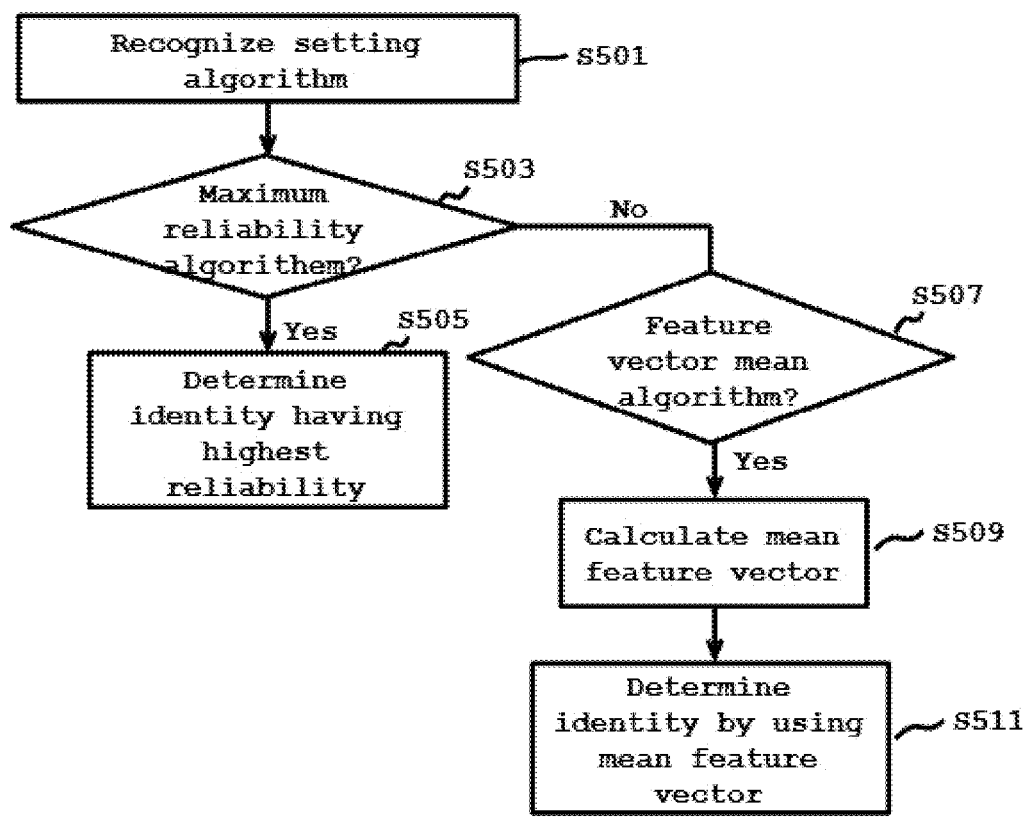
FIG. 7 is a diagram illustrating a detailed control flow for identity recognition.

FIG. 7 is a diagram illustrating a detailed control flow for identity recognition.

The control flow of FIG. 7 is performed by (the control unit 170 of) the face recognition device 100. Preferably, the face recognition program may be loaded to (the control unit 170 of) the face recognition device 100, and identity recognition for a face object is performed. The control flow of FIG. 7 is preferably performed subsequently to FIG. 6. The control flow of FIG. 7 is performed on the face list 131 corresponding to the imaging device 200.

First, (the control unit 170 of) the face recognition device 100 recognizes a setting algorithm to be used for identity recognition (S501). (The control unit 170 of) the face recognition device 100 according to the present disclosure may recognize the identity of a face object by using a maximum reliability algorithm and/or a feature vector mean algorithm. Setting data indicative of the setting algorithm is stored in the storage unit 130. (The control unit 170 of) the face recognition device 100 reads the setting data, and may recognize an identity corresponding to the face object according to a specific identity recognition algorithm or one of two identity recognition algorithms based on a corresponding value of the setting data.

At least the identity recognition algorithm recognizes the identity based on (using) a plurality of feature vectors stored in the face object. Each of the feature vectors is a feature vector which is mapped on and stored in each of the entries of a face-history buffer and extracted from face data (image data of a face box) detected from a series of image frames.

When the set identity recognition algorithm is a maximum reliability algorithm (S503), (the control unit 170 of) the face recognition device 100 determines an identity having the highest reliability with respect to each of the face objects (S505).

Specifically, (the control unit 170 of) the face recognition device 100 searches each of the face-history buffers of the face objects for an entry having the highest identity reliability, and determines the identity (information) of the retrieved entry as the identity of a face object.

If the maximum reliability algorithm is used, after (the control unit 170 of) the face recognition device 100 extracts a feature vector from a detected face, (the control unit 170 of) the face recognition device 100 classifies (predicts) a face by using the extracted feature vector as an input in the process of updating the face object (S415 of FIG. 6).

The face classification for identity recognition is performed according to a deep learning (identity) recognition algorithm, such as a Support Vector Machine (SVM). The SVM outputs a classification result with respect to an input feature vector by applying the identity list of the storage unit 130 as a classification category. The classification result includes one identity (information) of the identity list. Furthermore, the SVM may further include a reliability value of the classification result. (The control unit 170 of) the face recognition device 100 may store the reliability value in a new entry of the update process along with identity information.

As described above, (the control unit 170 of) the face recognition device 100 predicts the identity and calculates the reliability value by using each of a plurality of feature vectors corresponding to a specific face object from a series of image frames, determines, as the identity of a face object, the identity of a feature vector having the highest reliability among the identity prediction, and stores the identity of the feature vector as the current identity of the face object.

If the feature vector mean algorithm instead of the maximum reliability algorithm is used as an algorithm for identity recognition (S507), (the control unit 170 of) the face recognition device 100 calculates a mean feature vector from the plurality of feature vectors corresponding to the face object from the series of image frames (S509). For example, (the control unit 170 of) the face recognition device 100 may calculate a mean feature vector by averaging the feature vectors of entries of the face-history buffer of the face object.

Thereafter, (the control unit 170 of) the face recognition device 100 determines an identity corresponding to the face object by using the calculated mean feature vector (S511). For example, (the control unit 170 of) the face recognition device 100 provides the calculated mean feature vector to the SVM as an input, recognizes a classification result for an identity list according to an SVM program, recognizes the identity of the classification result as a current identity of the face object, and sets the recognized identity in the face object.

As described with reference to FIGS. 4 to 7, the present disclosure is configured to raise a face detection speed by using the deep learning algorithm mixed with the face detection algorithm having a low face detection rate, but capable of execution at a high speed. Furthermore, the present disclosure enables a low detection rate of a high-speed face detection algorithm to be increased using the history buffer of a face object.

If the size of a face-history buffer is set to 10 (entries), the deep learning face detection algorithm is performed every 10 frames (deep learning execution periods), the HOG-based face detection algorithm is performed on the remaining 9 frames of the 10 frames, and the KCF tracker is accessorily used, face detection and recognition were possible at a speed of 27.50 ms with respect to an image frame of a full-HD image.

Furthermore, it was found that the present disclosure has a face detection rate of about 0.944 identical with or similar to that of a case where only the deep learning face detection algorithm is used.

Furthermore, if face recognition is performed using a face-history buffer, both the maximum reliability algorithm and the feature vector mean algorithm have an identity recognition rate of about 0.940. It showed improved results of about 0.100 (10%) compared to an identity recognition rate not using statistical processing (face-history buffer).

INDUSTRIAL APPLICABILITY

The present disclosure described above may be substituted, modified and changed in various ways by a person having ordinary skill in the art to which the present disclosure pertains without departing from the technical spirit of the present disclosure, and thus the present disclosure is not restricted by the aforementioned embodiments and the accompanying drawings.

The invention claimed is:

1. A face recognition method by performing in a face recognition device, recognizing a face in a series of image frames from an imaging device, and tracking the recognized face, comprising steps of:
    capturing a first image frame by the imaging device and preparing a face list having a face object from the first image frame;
    capturing a second image frame by the imaging device and detecting one or more faces from the second image frame,
    wherein the series of image frames includes the first and second image frames, and the first image frame is captured before the second image frame;
    updating the face object of the face list from the first image frame by using information of the detected one or more faces from the second image frame; and
    recognizing an identity corresponding to the face object by using a plurality of feature vectors of the updated face object,
    wherein the face object includes a face-history buffer having a current face coordinate region and a plurality of entries, and one or more of the plurality of entries includes a first face information of the face object extracted from the first image frame,
    wherein the step of updating the face object of the face list comprises:
        calculating an Intersection over Union (IOU) value between a face coordinate region detected from the second image frame and the current face coordinate region of the face object; and
        when the calculated IOU value is a threshold or more, adding one entry having a second face information extracted from the second image frame to the face-history buffer and setting the current face coordinate region as the face coordinate region detected from the second image frame.

2. The face recognition method of claim 1, wherein:
    the step of detecting the faces comprises detecting a face in the second image frame according to a deep learning face detection algorithm if the second image frame is an image frame according to a designated period, and detecting a face in the second image frame according to a Histogram of Oriented Gradients (HOG)-based face detection algorithm if the second image frame is not an image frame according to the designated period, and a face detection number according to the HOG-based face detection algorithm is greater than a face detection number according to the deep learning face detection algorithm.

3. The face recognition method of claim 1, wherein the step of updating the face object of the face list comprises:
tracking the face object by using a face tracker when each of calculated IOU values between all the detected faces is less than the threshold, and
removing the face object from the face list when a face detection failure number is a designated number or more.

4. The face recognition method of claim 1, wherein the step of updating the face object of the face list comprises generating, in the face list, a new face object indicative of the detected face if the detected face is not mapped on all face objects of the face list based on the calculation of the IOU value and a comparison of the threshold.

5. The face recognition method of claim 1, wherein the step of updating the face object of the face list comprises:
extracting a feature vector from detected face data corresponding to the face object, and
mapping the feature vector of the detected face on one of a plurality of face objects based on similarity between a feature vector from data of a single detected face and each of a plurality of feature vectors corresponding to the plurality of face objects if the single detected face corresponding to the plurality of face objects is present.

6. The face recognition method of claim 1, wherein the step of recognizing the identity corresponding to the face object by using the plurality of feature vectors comprises determining, as the identity of the face object, an identity of a feature vector corresponding to identity prediction having a highest reliability in the identity prediction performed using each of the plurality of feature vectors corresponding to the face object from the series of image frames.

7. The face recognition method of claim 1, wherein the step of recognizing the identity corresponding to the face object by using the plurality of feature vectors comprises:
calculating a mean feature vector from the plurality of feature vectors corresponding to the face object from the series of image frames, and
recognizing the identity corresponding to the face object by using the calculated mean feature vector.

8. A face recognition device by recognizing a face in a series of image frames from an imaging device and tracking the recognized face, comprising:
an image reception unit receiving the series of image frames from the imaging device, wherein the series of image frames includes a first and a second image frames, the first image frame captured before the second image frame by the image device;
a storage unit storing the received series of image frames and a face list from the first image frame indicatives of recognized one or more face objects; and
a control unit detecting one or more faces from the second image frame, updating a face object of the face list from the first image frame stored in the storage unit by using information of the detected one or more faces, and recognizing an identity corresponding to the face object by using a plurality of feature vectors of the updated face object of the face list,
wherein the face object includes a face-history buffer having a current face coordinate region and a plurality of entries, and one or more of the plurality of entries includes a first face information of the face object extracted from the first image frame,
wherein the control unit is configured to
calculate an Intersection over Union (IOU) value between a face coordinate region detected from the second image frame and the current face coordinate region of the face object; and
when the calculated IOU value is a threshold or more, add one entry having a second face information extracted from the second image frame to the face-history buffer and set the current face coordinate region as the face coordinate region detected from the second image frame.

9. The face recognition device of claim 8, wherein:
in order to detect the one or more faces, the control unit detects a face in the second image frame according to a deep learning face detection algorithm, if the second image frame is an image frame according to a designated period, and detects a face in the second image frame according to a Histogram of Oriented Gradients (HOG)-based face detection algorithm accelerated by a Graphics Processing Unit (GUI) of the control unit, if the second image frame is not an image frame according to the designated period, and
a face detection number according to the HOG-based face detection algorithm is greater than a face detection number according to the deep learning face detection algorithm.

10. The face recognition device of claim 8, wherein in order to update the face object of the face list, the control unit tracks the face object by using a face tracker when each of calculated IOU values between all the detected faces is less than the threshold, and removes the face object from the face list when a face detection failure number is a designated number or more.

11. The face recognition device of claim 8, wherein in order to update the face object of the face list, the control unit generates, in the face list, a new face object indicative of the detected face if the detected face is not mapped on all face objects of the face list based on the calculation of the IOU value and a comparison of the threshold.

12. The face recognition device of claim 8, wherein in order to update the face object of the face list, the control unit extracts a feature vector from detected face data corresponding to the face object, and maps the feature vector of the detected face on one of a plurality of face objects based on similarity between a feature vector from data of a single detected face and each of a plurality of feature vectors corresponding to the plurality of face objects if the single detected face corresponding to the plurality of face objects is present.

13. The face recognition device of claim 8, wherein in order to recognize the identity corresponding to the face object by using the plurality of feature vectors, the control unit determines, as the identity of the face object, an identity of a feature vector corresponding to identity prediction having a highest reliability in the identity prediction performed using each of the plurality of feature vectors corresponding to the face object from the series of image frames.

* * * * *